United States Patent
Stojanovic

(10) Patent No.: US 7,844,006 B2
(45) Date of Patent: Nov. 30, 2010

(54) METHOD OF NON-UNIFORM DOPPLER COMPENSATION FOR WIDEBAND ORTHOGONAL FREQUENCY DIVISION MULTIPLEXED SIGNALS

(75) Inventor: Milica Stojanovic, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 598 days.

(21) Appl. No.: 11/853,106

(22) Filed: Sep. 11, 2007

(65) Prior Publication Data

US 2009/0067514 A1   Mar. 12, 2009

(51) Int. Cl.
  *H04K 1/10* (2006.01)
(52) U.S. Cl. .................. 375/260; 375/267; 375/295; 375/343; 370/203; 370/204; 370/205; 370/206; 370/207; 370/208; 370/209; 370/210
(58) Field of Classification Search ................. 375/260
  See application file for complete search history.

(56) References Cited

U.S. PATENT DOCUMENTS

| | | | |
|---|---|---|---|
| 5,444,697 A | 8/1995 | Leung et al. | |
| 2004/0086055 A1 | 5/2004 | Li | |
| 2004/0190657 A1 | 9/2004 | Seki et al. | |
| 2006/0029168 A1* | 2/2006 | Chuang et al. | 375/347 |
| 2006/0239364 A1* | 10/2006 | Wilhelmsson | 375/260 |
| 2008/0198695 A1* | 8/2008 | Abdi | 367/134 |

OTHER PUBLICATIONS

International Search Report for PCT/US2008/069625 dated Oct. 3, 2008; 2 pages.

Kim, Byung-Chul et al., "Parameter Study of OFDM Underwater Communications System", IEEE, 2000, pp. 1251-1255.
Stojanovic, M. et al., "Reduced-Complexity Spatial and Temporal Processing of Underwater Acoustic Communication Signals", Journal of the Acoustical Society of America, 35 pages, Aug. 1995.
Chitre, M. et al., "Performance of Coded OFDM in Very Shallow Water Channels and Snapping Shrimp Noise", IEEE/MTS Oceans 2005, Washington DC, Sep. 2005, pp. 1-6.
Li, Baosheng et al., "Non-Uniform Doppler Compensation for Zero-Padded OFDM over Fast-Varying Underwater Acoustic Channels", Proc. of MTS/IEEE Oceans conference, Aberdeen, Scotland, Jun. 18-21, 2007, 6 pages.
Li, Baosheng et al., "Pilot-Tone Based ZP-OFDM Demodulation for an Underwater Acoustic Channel", Proc. of MTS/IEEE Oceans conference,, Boston, MA, Sep. 18-21, 2006, 5 pages.

* cited by examiner

*Primary Examiner*—Shuwang Liu
*Assistant Examiner*—Dhaval Patel
(74) *Attorney, Agent, or Firm*—Guerin & Rodriguez, LLP; William G. Guerin

(57) ABSTRACT

Described is a method for compensation of an OFDM signal propagating through Doppler-distorted, time-varying multipath channels. The method is based on low-complexity post-FFT signal processing. Minimum mean square error combining of signals is performed for signals received at spatially-distributed receiver elements using adaptive channel estimation and phase tracking. Doppler shifts are modeled as a consequence of motion-induced time compression and dilation. The Doppler rate is assumed constant over one OFDM block but can vary between OFDM blocks. Thus a non-constant Doppler shift is accommodated by the method. Non-uniform Doppler compensation across subchannels is based on adaptive estimation and prediction of the Doppler rate. A single adaptively estimated parameter is used to track the phases of all the carriers and channel estimates are updated on a block by block basis.

12 Claims, 6 Drawing Sheets

METHOD OF NON-UNIFORM DOPPLER COMPENSATION FOR WIDEBAND ORTHOGONAL FREQUENCY DIVISION MULTIPLEXED SIGNALS

GOVERNMENT RIGHTS IN THE INVENTION

This invention was produced utilizing U.S. Government support under Grant Number OCE-0532223, awarded by the National Science Foundation and under Grant Number N00014-05-G0106, awarded by the U.S. Navy. The government may have certain rights in the invention.

FIELD OF THE INVENTION

The present invention relates generally to communications based on orthogonal frequency division multiplexing (OFDM). More particularly, the invention relates to a method of adaptive OFDM signal detection in a wideband communications system such as may be used in underwater acoustic communications.

BACKGROUND OF THE INVENTION

Multi-carrier modulation is an alternative to single-carrier broadband modulation for communications channels with frequency-dependent distortion. When used with rectangular pulse shaping, multi-carrier modulation and detection are efficiently implemented using the Fast Fourier Transform (FFT). An inverse FFT and FFT modulator/demodulator pair used in an OFDM technique enables channel equalization in the frequency domain, thus eliminating the need for potentially complex time-domain equalization of a single-carrier system. For this reason, OFDM is utilized in a number of systems, including wire-line digital subscriber loops (DSL), wireless digital audio and video broadcast (DAB, DVB) systems, and wireless local area networks (LANs) (e.g., IEEE 802.11 LANs). OFDM is also considered for fourth generation cellular systems and ultra-wideband (UWB) wireless communications in general.

While OFDM offers ease of channel equalization in the frequency domain, OFDM is sensitive to frequency offset. A frequency offset can result from a mismatch between the frequencies of the local oscillators, a Doppler distortion caused either by transmitter/receiver motion, or by a mismatch between transmitter and receiver sampling rates. An OFDM system can only tolerate a frequency offset that is significantly less than the carrier spacing, therefore frequency synchronization is used with OFDM systems. Any residual frequency offset causes loss of orthogonality between the carriers, and the resulting intercarrier interference (ICI) leads to performance degradation.

Algorithms have been proposed that are based on an assumption that the Doppler shift is equal for all subchannels. If the Doppler shift is caused by motion, the assumption is valid only for narrowband systems where the signal bandwidth B is substantially smaller than the center frequency $f_c$. A Doppler distortion a which has a value normally much less than one causes the kth carrier frequency $f_k$ to be observed at the receiver as $f_k + af_k$. In a narrowband OFDM system with K carriers spaced at $\Delta f$ such as represented by the example in FIG. 1A, $f_k$ is much greater than the signal bandwidth B which is $K\Delta f$, and the Doppler shift is approximately the same for all the carriers $f_1$ to $f_K$. In a wideband OFDM system such as represented by the example in FIG. 1B, the approximation is not valid, and the Doppler distortion causes different carriers f to experience substantially different frequency offsets.

Acoustic propagation occurs at low frequencies, therefore a high-rate underwater acoustic communications system is inherently wideband. In addition, the speed of sound in water is substantially lower than electromagnetic propagation through air or vacuum. Thus underwater acoustic communications are generally subject to severe motion-induced Doppler distortion. For a mobile underwater vehicle such as an autonomous underwater vehicle (AUV), the vehicle speed can be on the order of meters per second. Thus the Doppler rate for an AUV can be on the order of 0.001. Even in the absence of intentional motion, freely suspended transmitters and receivers are subject to drifting with waves and currents at a speed that can be less than a meter per second in calm conditions and at a speed of a few meters per second in rough seas. Consequently, Doppler shifting in a wideband acoustic system is not uniform across the signal bandwidth.

Underwater acoustic channels generally exhibit severe multipath propagation that produces a delay spread of a few milliseconds to more that 100 ms, depending on the communications system location and channel conditions. The channel is time varying with a Doppler spread that can be on the order of one Hz. High rate, bandwidth-efficient underwater acoustic communications traditionally use single-carrier modulation that relies on the use of adaptive multichannel processing based on joint phase synchronization and decision-feedback equalization; however, such communications require careful tuning of the receiver parameters. For example, the equalizer size and parameters of the digital phase-locked loop for each communications unit typically require tuning.

What is needed is a method for detection of wideband OFDM signals that addresses the above problems. The present invention satisfies this need and provides additional advantages.

SUMMARY OF THE INVENTION

In one aspect, the invention features a method for Doppler compensation of an OFDM signal. A predicted phase for each subchannel in a plurality of subchannels is determined for a current OFDM block in response to a phase estimate and a Doppler rate for a previous OFDM block. An angular offset is determined for each of the subchannels over the duration of the previous OFDM block and an estimate of the Doppler rate for the current OFDM block is generated. A final phase estimate is determined for each of the subchannels in response to the estimate of the Doppler rate for the current OFDM block. A data symbol estimate is generated for each of the subchannels in response to a respective one of the final phase estimates and a data symbol value is decided for each of the subchannels based on a respective one of the data symbol estimates. In one embodiment, the determination of the angular offset for each subchannel includes (i) determining a preliminary estimate of a data symbol for the subchannel from a current signal vector and the predicted phase for the subchannel and (ii) generating a tentative data symbol decision in response to the preliminary estimate of the data symbol for the subchannel.

In another aspect, the invention features a receiver for detection of an OFDM signal. The receiver includes an array of spatially-distributed receiver elements, a plurality of FFT demodulators and a minimum mean square error combiner. Each FFT demodulator is in communication with a respective one of the spatially-distributed receiver elements and the MMSE combiner is in communication with the FFT demodulators. The MMSE combiner performs adaptive channel estimation and uses an adaptively estimated parameter to track the phases of a plurality of subchannels of the OFDM signal for non-uniform Doppler compensation of the subchannels.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

The invention relates to a method for OFDM signal detection on Doppler-distorted, time-varying multipath channels and is based on low-complexity post-FFT signal processing. Minimum mean square error (MMSE) combining of signals is performed for signals received at a receiver array using adaptive channel estimation. Non-uniform Doppler compensation of subchannels is performed using a single adaptively estimated parameter associated with the Doppler rate.

Figure 1A:
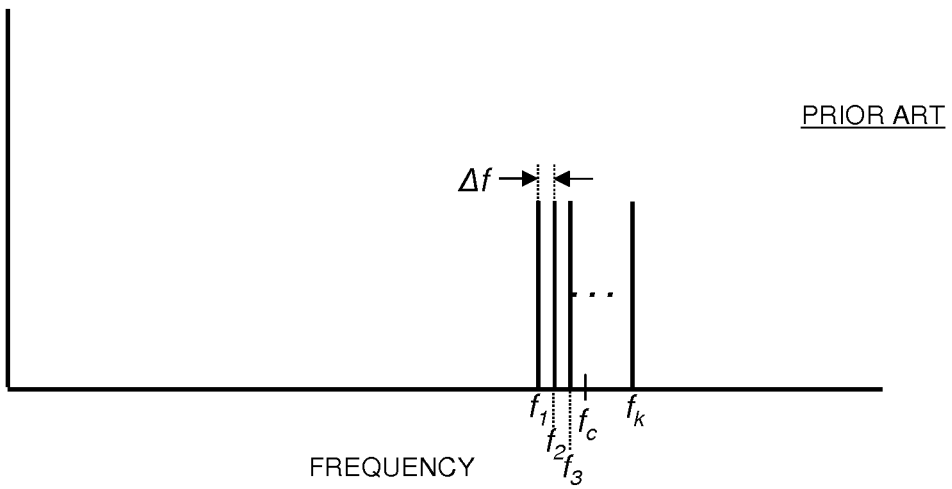
FIG. 1A and FIG. 1B show examples of carrier distributions for a narrowband OFDM system and a wideband OFDM system, respectively.
Figure 1B:
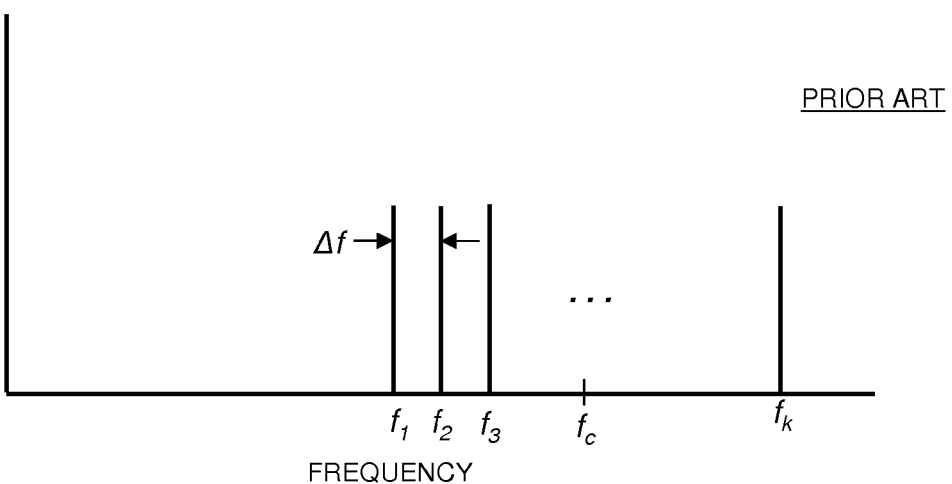
Figure 2:
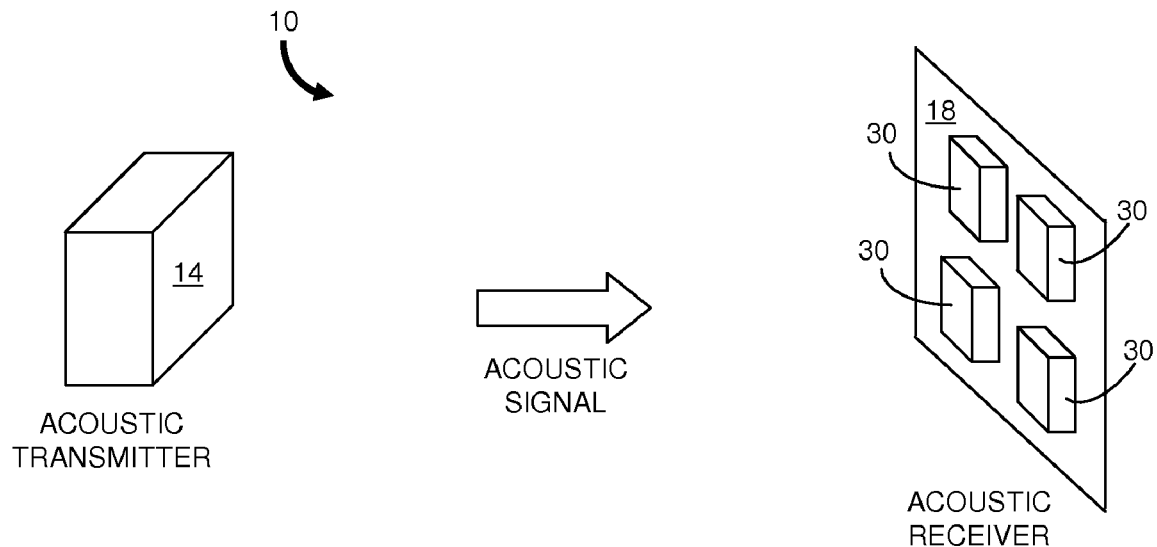
FIG. 2 is a block diagram of an acoustic underwater communications system.

Referring to FIG. 2, an acoustic underwater communications system 10 includes an acoustic transmitter 14 and an acoustic receiver 18. The transmitter 14 and the receiver 18 can each be mounted to an underwater platform. The position of the transmitter 14 relative to the receiver 18 can vary with time thereby defining a relative motion which can also vary with time. The receiver 18 includes an array of M spatially-distributed receiver elements 30 (only four are shown for clarity). Although shown as a 2×2 array, the receiver elements 30 can be configured differently. For example, a linear array can be preferred in some applications.

An embodiment of the acoustic underwater communications system according to the invention is based on uniform energy allocation for all OFDM subchannels as the acoustic channel properties are generally not known at the transmitter 14. The receiver 18 performs MMSE combining of signal received at the receiver elements 30 using adaptive channel estimation and phase tracking. All signal processing is performed digitally so there is no mismatch between the frequencies of local oscillators, and the Doppler shift is modeled as a consequence of motion-induced time compression/dilation. The Doppler rate is assumed to be constant over one OFDM block but can vary from one OFDM block to another. Thus a non-constant Doppler shift can be accommodated, such as when the speed and the direction of relative motion between the transmitter 14 and the receiver 18 change with time. Non-uniform Doppler compensation across subchannels is based on adaptive estimation and prediction of the Doppler rate. A single adaptively estimated parameter is used to track the phases of all the carriers. Channel estimates are also updated on a block by block basis.

In one embodiment, the acoustic underwater communications system is a zero-padded OFDM system. The zero-padded OFDM system has nearly equal performance to a conventional cyclic prefix OFDM system and has the benefit of conserving transmitter power. As the guard interval between successive OFDM blocks must be at least equal to the multipath spread, filling the guard interval according to a cyclic prefix technique can result in a significant waste of power when the multipath spread is comparable to the OFDM block duration. To enable same-size FFT demodulation in a zero-padded OFDM system, an overlap-add method is used if the multipath spread is not negligible with respect to the OFDM block duration. In this technique, sections of the guard intervals before and after the OFDM block are used because the multipath in an underwater acoustic channel is often non-causal. After overlap adding, the guard interval is discarded and the signal is demodulated using FFT as in a cyclic prefix system. Thus, after performing the FFT, the method is also applicable to a cyclic prefix system.

Acoustic Channel and System Model

In the OFDM system, the input data stream is serial-to-parallel converted into k data streams $d_k(n)$ for k=0 to K−1 which are used to form k signals $$u_k(t) = \sum_n d_k(n)e^{jk\Delta\omega(t-nT')}g(t-nT') \quad [1]$$

where n is the block number, g(t) is a rectangular pulse in time with unit amplitude and duration T, $T'=T+T_g$ where $T_g$ is the guard interval which is longer than the multipath spread, and $\Delta\omega=2\pi\Delta f$ where $\Delta f=1/T$ is the carrier spacing. The signals $u_k(t)$ are shifted in frequency and added so that the modulated signal is given by $$s(t) = \text{Re}\left\{\sum_{k=0}^{K-1} u_k(t)e^{j\omega_0 t}\right\} \quad [2]$$

where $f_0$ (i.e., $2\pi\omega_0$) is the lowest carrier frequency and $f_k=f_0+k\Delta f$ denotes the kth carrier frequency. The symbol rate is $R=K/(T+T_g)$ symbols per second (sps) and the signal bandwidth is $B=K\Delta f$. The resulting bandwidth efficiency is $R/B=1/(1+T_g/T)$ sps/Hz.

The signal s(t) propagates through a channel which has an impulse response c(t, n) during the nth OFDM block interval (i.e., between time nT' and time nT'+T) approximated by $$c(t, n) = \sum_{p} A_p(n)\delta(t + a(n)t - \tau_p(n)).  \quad [3]$$

The path gains, delays and the Doppler rate are assumed to be constant over the block duration T, but they can change from one OFDM block to another. The Doppler rate is assumed to be equal for all paths. Generally, the assumption is valid for systems where motion between the transmitter and the receiver is the dominant source of Doppler distortion and where the differences between the angles of multipath arrivals are small. One example is a system with horizontal transmission through shallow water where the transmission range is significantly greater than the water depth. The corresponding transfer function C(f, n) of the channel is therefore given by $$C(f, n) = \sum_{p} A_p(n) e^{-j2\pi f \tau_p(n)/(1+a(n))}.  \quad [4]$$

During the nth block interval, the output of the demodulator for the kth subchannel is $$y_k(n) = \sum_{l=0}^{K-1} y_{k,l}(n) + \omega_k(n)  \quad [5]$$

where $y_{k,l}(n)$ is the system response to the signal $u_l(t)$ and $w_k(n)$ is additive noise for the nth symbol. The system response $y_{k,l}(n)$ is given by $$y_{k,l}(n) = c_k(n)\rho_{k,l} d_l(n) e^{j\theta_l(n)}  \quad [6]$$

where $$c_k(n) = C\left(\frac{f_k}{1+a(n)}, n\right) \approx C(f_k, n)$$

$$\theta_k(n) = \frac{a(n)}{1+a(n)} \omega_k nT' \approx a(n)\omega_k nT'$$

$$\rho_{k,l} = \frac{1}{1+a(n)} \text{sinc}(\alpha_{k,l}) \cdot e^{j\alpha_{k,l}} \approx \text{sinc}(\alpha_{k,l}) \cdot e^{j\alpha_{k,l}}$$

$$\alpha_{k,l} = \frac{(l-k)\Delta\omega + a(n)\omega_l}{1+a(n)} \cdot \frac{T}{2} \approx a(n)\omega_k \frac{T}{2} + (l-k)\pi. \quad [7]$$

The approximations are valid for values of a(n) much less than one which is typically the situation.

The residual Doppler shift existing prior to demodulation is much less than the carrier spacing, i.e., $a(n)f_k \ll \Delta f$. Thus $\rho_{k,k}$ is approximately one and the received signal can be approximated as $$y_k(n) = c_k(n) d_k(n) e^{j\theta_k(n)} + z_k(n)  \quad [8]$$

where the first term includes the desired information on the symbol $d_k(n)$, and the second term represents residual ICI and noise. If the residual Doppler is small, $|\rho_{k,l}| \ll |\rho_{k,k}|$, and the ICI can be treated as additional noise. Under these circumstances, the primary distortion to the signals is due to the time varying phase offset $\theta_k(n)$.

Detection of OFDM Signal

Figure 3:
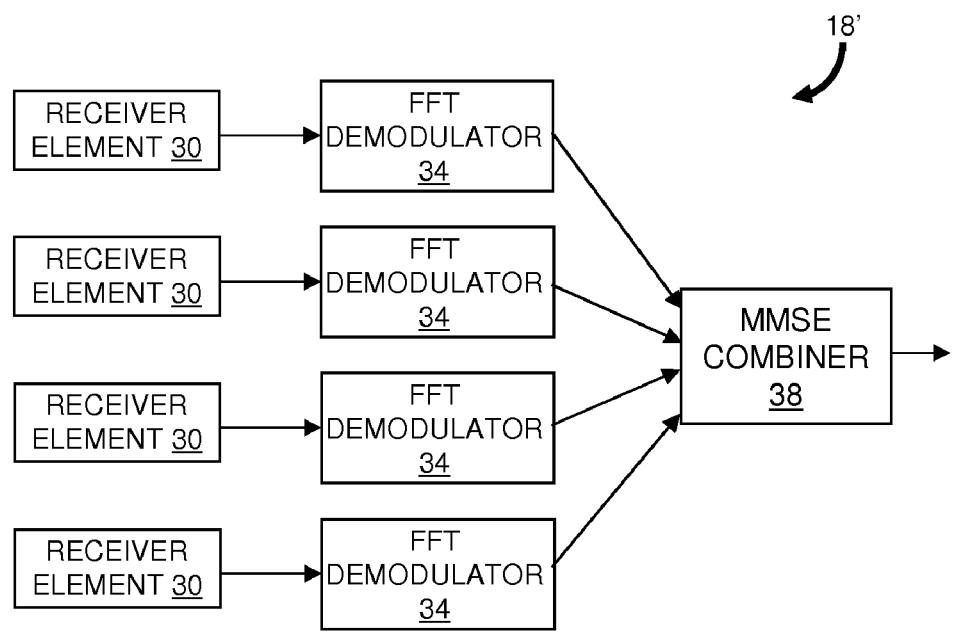
FIG. 3 is a block diagram of an embodiment of a receiver for detection of an OFDM signal according to the invention.
Figure 4:
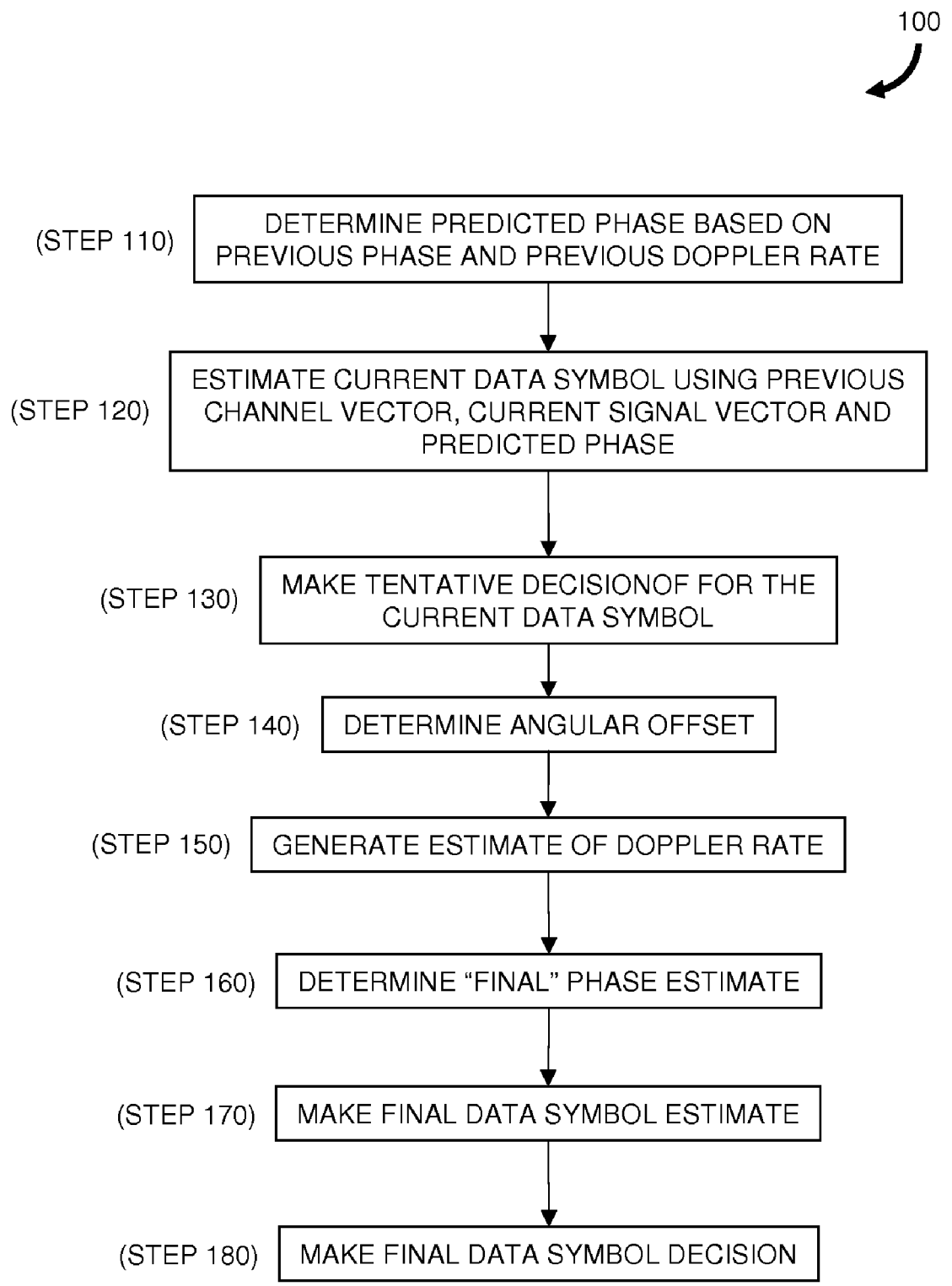
FIG. 4 is a flowchart representation of an embodiment of a method for non-uniform Doppler compensation of a wideband OFDM signal according to the invention.

Referring to FIG. 3, the spatially-distributed receiver elements 30 of FIG. 2 are in communication with a respective FFT demodulator 34 which in turn communicates with a MMSE combiner 38. The separation between the receiver elements 30 is sufficiently small so that the motion-induced frequency offset is assumed to be the same for all the elements 30. FIG. 4 is a flowchart representation of an embodiment of a method 100 for non-uniform Doppler compensation of a wideband OFDM signal according to the invention and which can be implemented in the receiver 18' of FIG. 3 after demodulation by the FFT demodulators 34.

Based on equation [8], an M-element received signal vector is given by $$y_k(n) = c_k(n) d_k(n) e^{j\theta_k(n)} + z_k(n)  \quad [9]$$

where the bolded parameters include M values. Equation [9] can be extended to include M phases; however, generally motion-induced phase distortion can be assumed to be similar for all the receiver elements 30 without significant degrading system performance. A MMSE combination yields an optimal estimate $\hat{d}_{ko}(n)$ of the data symbol in the kth channel $$\hat{d}_{ko}(n) = \gamma_k(n) c'_k(n) y_k(n) e^{-j\theta_k(n)}  \quad [10]$$

where the prime designation indicates a conjugate transpose and $$\gamma_k(n) = (\sigma_z^2 + c'_k(n) c_k(n))^{-1}.  \quad [11]$$

The channel vector $c_k(n)$ and the phase $\theta_k(n)$ are generally unknown and vary with time; however, adaptive estimates of these parameters are used according to the method of the invention to implement the MMSE combiner. A phase estimate $\hat{\theta}_k(n)$ and a data symbol decision $\tilde{d}_k(n)$ are used to compute an unbiased least-squares estimate of the channel vector $\hat{c}_k(n)$ according to an update equation $$\hat{c}_k(n) = \lambda \hat{c}_k(n-1) + (1-\lambda) y_k(n) e^{-j\hat{\theta}_k(n)} \tilde{d}^*_k(n)  \quad [12]$$

where $\lambda$ is a positive-valued channel tracking constant having a value less than one. The update is performed on a symbol by symbol basis.

The channel estimate $\hat{c}_k(n)$ is used to estimate the data symbol $\hat{d}_{ko}(n)$ according to equation [10]. The channel vector $c_k(n)$ typically varies slowly between consecutive OFDM blocks and, therefore, the previous channel vector estimate $\hat{c}_k(n-1)$ can be used to generate an estimate of the current data symbol $\hat{d}_k(n)$ as $$\hat{d}_k(n) = \hat{\gamma}_k(n-1) \hat{c}'_k(n-1) y_k(n) e^{-j\hat{\theta}_k(n)}  \quad [13]$$

where the scalar $\hat{\gamma}_k(n-1)$ is determined using the channel estimate and noise variance which are obtained using a recursive least squares estimation. Referring again to equation [11], the noise variance can be omitted for high signal-to-noise (SNR) conditions. Normalization, if required (i.e., modulations with non-constant amplitudes), can be performed using only the channel energy. Normalization is not needed for constant amplitude modulation (e.g., phase-shift keying (PSK)).

The estimation of phase is based on an assumption of motion-induced Doppler distortion where the phase $\theta_k(n)$ is given by $$\theta_k(n) = \theta_k(n-1) + a(n)\omega_k T'.  \quad [14]$$

Thus phase is tracked using a single estimate of the Doppler rate a(n) to determine the phases for all the OFDM subchannels, resulting in significant reduction in the computational load, especially for OFDM systems having a large number of carriers.

For a phase estimate $\hat{\theta}_k(n-1)$ and a channel estimate $\hat{c}_k(n-1)$ available at the beginning of the nth detection time, a data symbol estimate $\hat{d}_{k1}(n)$ can be determined from the received signal $y_k(n)$ as $$\hat{d}_{k1}(n) = \hat{\gamma}_k(n-1)\hat{c}'_k(n-1)y_k(n)e^{j\hat{\theta}_k(n-1)}. \quad [15]$$

This data symbol estimate $\hat{d}_{k1}(n)$; however, can be inaccurate because the phase $\theta_k(n)$ can change significantly over an OFDM block duration. Using the previous phase estimate $\theta_k(n-1)$ derived according to equation [14] can result in a significant angular offset between the data estimate $\hat{d}_{k1}(n)$ and the true value $d_k(n)$ of the data symbol. To generate an updated phase estimate $\hat{\theta}_k(n)$ for use in determining the actual data symbol estimate $\hat{d}_k(n)$, this angular offset has to be determined. To make the determination, at least some of the data symbols $d_k(n)$ are required. While some of the data symbols $d_k(n)$ can be a-priori known pilot symbols, the others can be obtained by making tentative decisions using a better estimate of the phase than the estimate from the previous OFDM block.

According to the method 100, the estimated phase $\hat{\theta}_k(n-1)$ and the estimated Doppler rate $\hat{a}(n-1)$ from the previous block are used to determine (step 110) a predicted phase $\check{\theta}_k(n)$ for the current block $$\check{\theta}_k(n) = \hat{\theta}_k(n-1) + \hat{a}(n-1)\omega_k T'. \quad [16]$$

The prediction of the phase is available at the beginning of the nth detection interval an is used to generate (step 120) an estimate of the data symbol $\hat{d}_{k2}(n)$ $$\hat{d}_{k2}(n) = \hat{\gamma}_k(n-1)\hat{c}'_k(n-1)y_k(n)e^{-j\check{\theta}_k(n)} \quad [17]$$
$$= d_{k1}(n)e^{-j\hat{a}(n-1)\omega_k T'}.$$

The estimate is used to make (step 130) tentative decisions $\bar{d}_k(n)$. More specifically, a number of channels K can be pilot channels assigned with known values for the nth detection interval whereas decisions are made for the data symbols of the other channels for the nth detection interval. In one embodiment, all the channels are used as pilot channels starting with the first symbol (n=1) and the number of pilot channels can be reduced or set to zero after a training period.

According to the method 100, the data symbol $\bar{d}_k(n)$ is used to determine (step 140) the angular offset, i.e., the phase change occurring in the kth subchannel over the time interval T'. If the phase change is caused by motion, as described by equation [14], the angular offsets for all the subchannels contain information on the Doppler rate. Consequently, the Doppler rate can be estimated (step 150) by determining a mean Doppler rate for multiple subchannels. In one embodiment, the mean Doppler rate $\hat{a}(n)$ is determined from all the subchannels:

$$\hat{a}(n) = \frac{1}{K}\sum_{k=0}^{K-1}\frac{\Delta\hat{\theta}_k(n)}{\omega_k T'} \quad [18]$$

In other embodiments, the mean Doppler rate $\hat{a}(n)$ is determined from a limited number of subchannels for different time intervals and changing the number of subchannels used to determine the mean over time. For example, the mean Doppler rate $\hat{a}(n)$ can be determined initially only for the pilot channels and then later determined for all the subchannels for better averaging as estimates are refined. In another embodiment, the angular offset is filtered before determining the mean Doppler rate $\hat{a}(n)$ according to $$\Delta\hat{\theta}_k(n) = \lambda_\theta \Delta\hat{\theta}_k(n-1) + (1-\lambda_\theta)\langle \hat{d}_{k1}(n)\bar{d}^*_k(n)\rangle \quad [19]$$

where $\lambda_\theta$ is a constant value between zero and one.

Once the Doppler rate $\hat{a}(n)$ is determined, the motion-induced Doppler distortion model set forth in equation [14] is used to generate (step 160) the final phase estimates $\hat{\theta}_k(n)$ for all the channels k:

$$\hat{\theta}_k(n) = \hat{\theta}_k(n-1) + \hat{a}(n)\omega_k T' \quad [20]$$

and these values are used to determine (step 170) the data symbol estimates $\hat{d}_k(n)$ $$\hat{d}_k(n) = \hat{\gamma}_k(n-1)\hat{c}'_k(n-1)y_k(n)e^{-j\hat{\theta}_k(n)} = d_{k1}(n)e^{-j\hat{a}(n)\omega_k T'}. \quad [21]$$

The final data symbol decisions $\bar{d}_k(n)$ are made (step 170) from the estimates $\hat{d}_k(n)$ from equation [21] except for the pilot channels where the data symbol decisions are the actual data values for those values.

The method 100 is performed in an iterative manner, that is, estimations are used to make subsequent estimations which are used to make additional subsequent estimations and so on. Thus the steps of the method are typically repeated throughout a communications session.

Experimental Performance

The method of the invention as described above was applied to a set of experimental data. Experimental parameters are listed in Table 1. The transmitter and receiver were freely suspended from boats in shallow water. Quadrature phase-shift keying (QPSK) modulation was employed. A guard interval $T_g$ of 25 ms was used and the number of subchannels used ranged from 128 to 2,048. Each frame contained a total of 32,768 data symbols. The data symbols were distributed into OFDM blocks with each block containing K symbols.

TABLE 1

| | |
|---|---|
| Range | 2.5 km |
| Water Depth | 12 m |
| Transmitter and Receiver Depth | 6 m |
| Receiver Elements | 12 elements |
| Receiver Element Configuration | 13.5 cm vertical separation (~3 wavelengths at $f_c$) (1.5 m span) |
| Transmission Bandwidth | 22 kHz to 46 kHz |

Transmitter modulation included generating a baseband signal u(t) which was then translated by a frequency $f_0$. The baseband signal u(t) was generated directly at an output sampling rate of 96 kHz to provide compatibility with the varying number of subchannels evaluated. OFDM modulation was implemented using an inverse fast Fourier transform (IFFT) of size $N_s=4K$ for each block of K data symbols with zero values appended to achieve a full length of 4K. The size of the IFFT was chosen to avoid the need to upsample the baseband signal u(t) prior to frequency translation.

The received signal was converted to digital format using the same 96 kHz sampling frequency for the transmitted signal and all subsequent processing was performed digitally. The received signal was downconverted and frame synchronized by matched filtering the frame preambles. Table 2 summarizes the salient experimental parameters.

TABLE 2

| number of subchannels | FFT size | carrier spacing [Hz] | OFDM symbol duration [ms] | bandwidth efficiency [sps/Hz] | bit rate [kbps] |
|---|---|---|---|---|---|
| 128 | $2^9$ | 187.5 | 5.3 | 0.17 | 8.4 |
| 256 | $2^{10}$ | 93.75 | 10.6 | 0.29 | 14.3 |
| 512 | $2^{11}$ | 46.87 | 21.3 | 0.46 | 22.1 |
| 1,024 | $2^{12}$ | 23.4 | 42.6 | 0.63 | 30.2 |
| 2,048 | $2^{13}$ | 11.71 | 85.3 | 0.77 | 37.1 |

The performance of the wideband OFDM system varies according to the number K of subchannels. Generally, more subchannels results in a greater bandwidth efficiency; however, the OFDM block duration increases as the number K of subchannels increases. Increasing the block duration makes tracking the channel variation between blocks more difficult and the residual Doppler shift may not be negligible with respect to the carrier spacing, resulting in ICI. In contrast, decreasing the block duration can reduce system performance due to multipath effects. Thus there exists a tradeoff between the number K of subchannels and the block duration to achieve a desired system performance.

Figure 5:
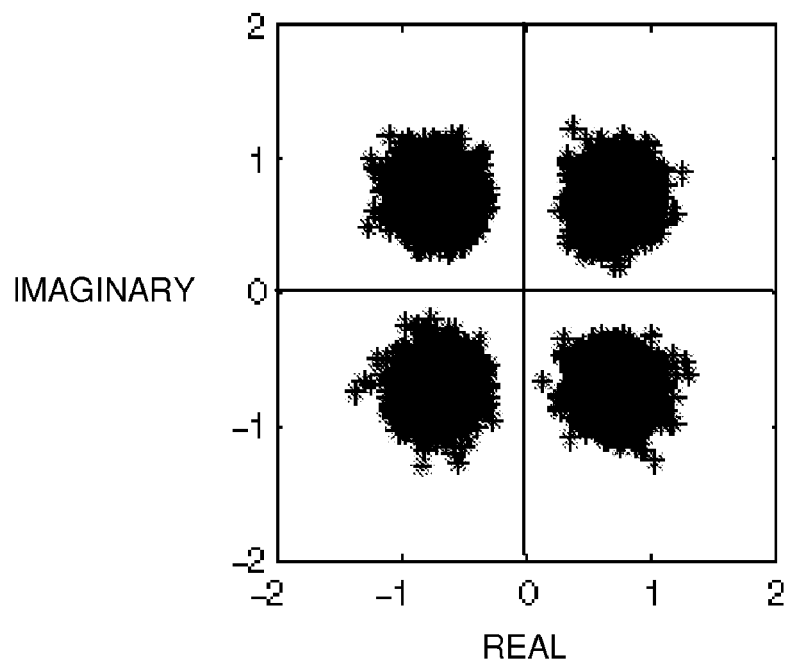
FIG. 5 shows a scatter plot of symbol estimates made for 32 OFDM blocks of 1,024 symbols per block in an experimental application of an embodiment of the method of the invention.
Figure 6:
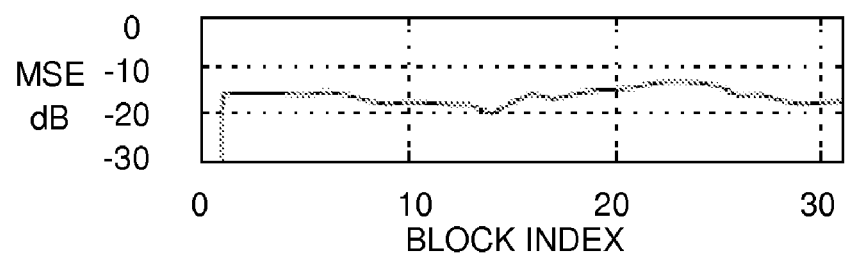
FIG. 6 illustrates the mean squared error ($MSE_t$) for each OFDM block for the data represented in the scatter plot of FIG. 5.

Experimental results for signal processing according to the method of the invention with an OFDM signal having 1,024 subchannels are shown in FIG. 5 through FIG. 10. Phase difference filtering was not used. No overlap adding was used in the processing as the block duration was significantly greater than the multipath spread. The first OFDM block was used to initialize the method 100 and no pilot signals were subsequently used. The scatter plot of FIG. 5 shows the symbol estimates $\hat{d}_k(n)$. No decision errors were present in the 32 OFDM blocks of 1,024 symbols per block. FIG. 6 illustrates the mean squared error ($MSE_t$) for each OFDM block for the data represented in the scatter plot of FIG. 5 where the $MSE_t$ is given by $$MSE_t(n) = \frac{1}{K}\sum_{k=0}^{K-1} |d_k(n) - \hat{d}_k(n)|^2. \quad [22]$$

Figure 7:
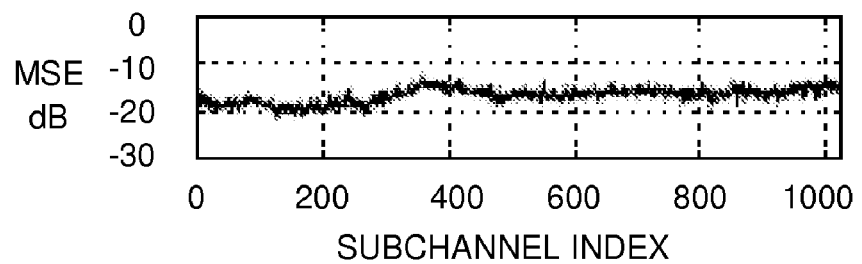
FIG. 7 illustrates the mean squared error ($MSE_f$) for each of the 1,024 subchannels for the data shown in the scatter plot of FIG. 5.

FIG. 7 illustrates the mean squared error ($MSE_f$) for each of the 1,024 subchannels for the data shown in FIG. 5 where the $MSE_t$ is given by $$MSE_f(k) = \frac{1}{N}\sum_{n=1}^{N} |d_k(n) - \hat{d}_k(n)|^2. \quad [23]$$

Figure 8:
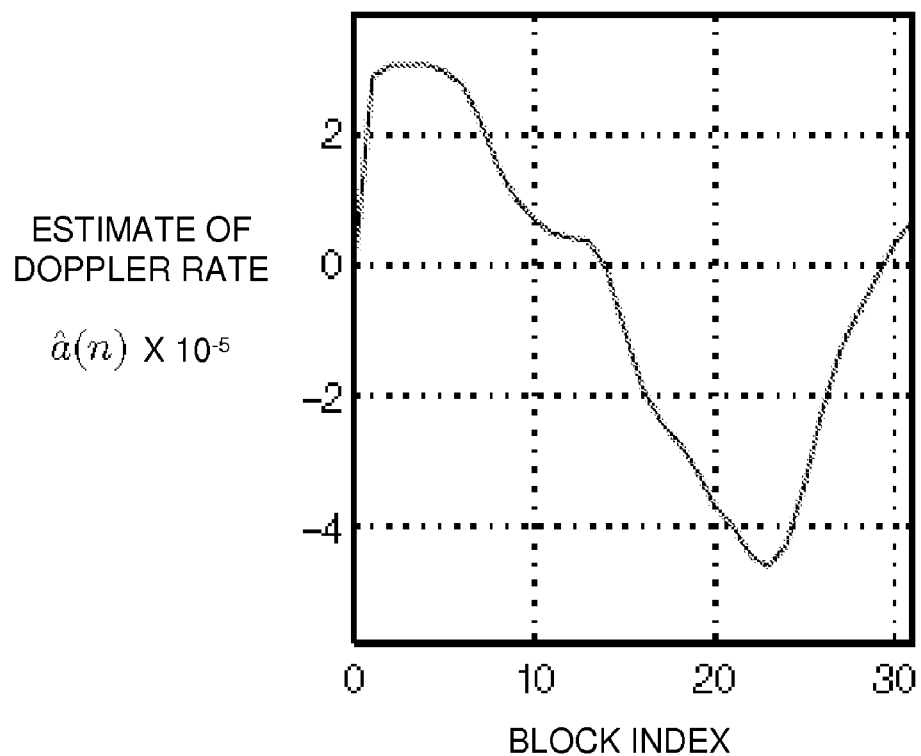
FIG. 8 shows an estimate of the Doppler rate for the 32 OFDM blocks of data in the scatter plot of FIG. 5.

FIG. 8 shows an estimate of the Doppler rate $\hat{a}(n)$ for the 32 OFDM blocks. As shown, there is a significant time variation over the 32 blocks; however, the value of the Doppler rate changes slowly from one OFDM block to another, enabling the receiver to track the Doppler rate. Moreover, the absolute level of the Doppler rate is sufficiently low so that the assumption of negligible ICI is justified.

Figure 9:
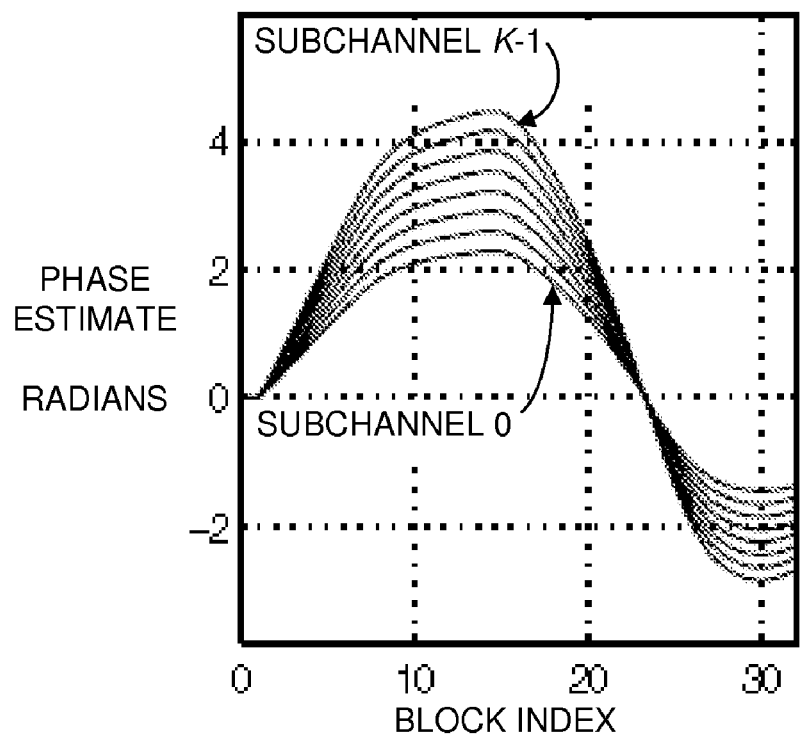
FIG. 9 graphically indicates eight of the 1,024 subchannel phases as a function of OFDM blocks corresponding to the estimated Doppler rate of FIG. 8.

FIG. 9 graphically shows eight of the 1,024 phases corresponding to the estimated Doppler rate $\hat{a}(n)$. The illustrated phase values indicate a wave-like motion during tracking of the phase. The observed Doppler shift of approximately 7 Hz and the corresponding relative velocity of 0.25 m/s are consistent with the experimental conditions.

Figure 10:
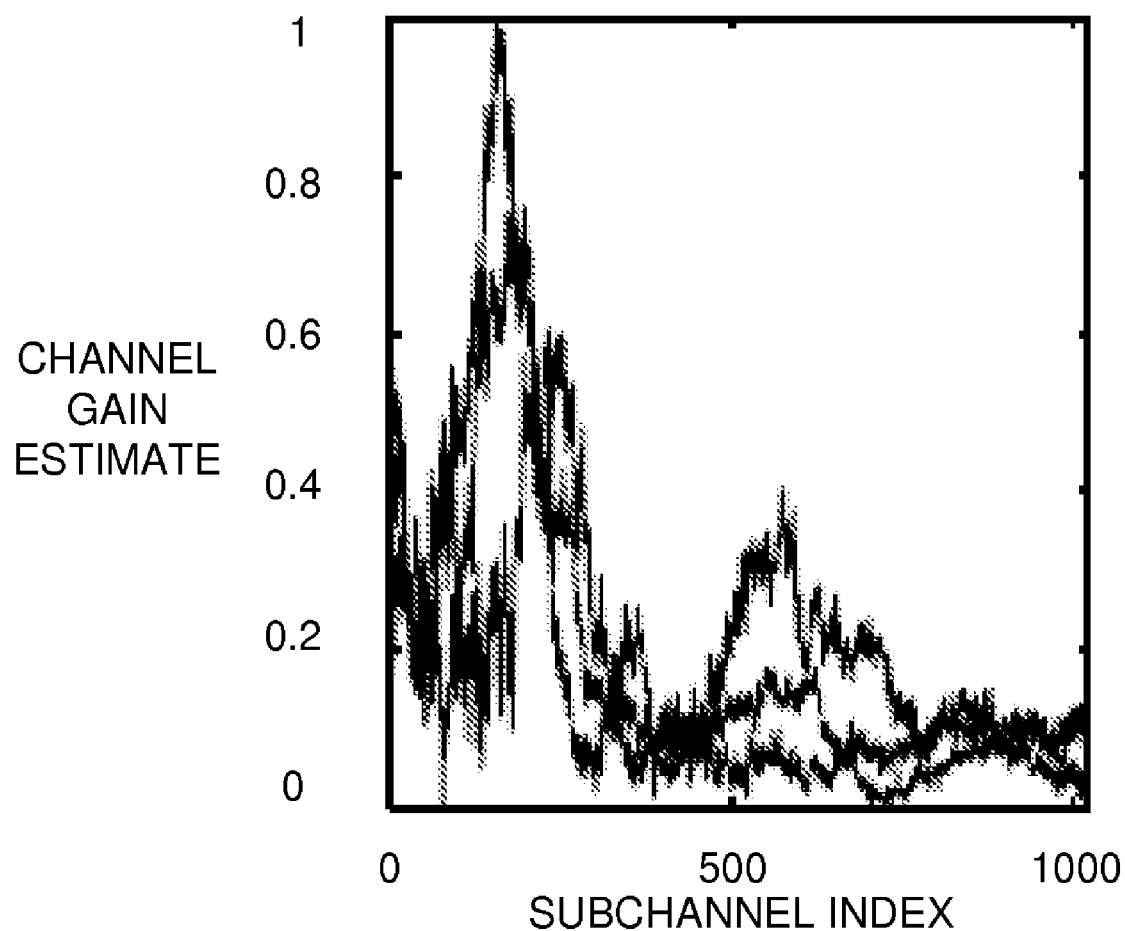
FIG. 10 graphically illustrates the channel estimates representing the transfer function magnitudes for three receiver elements during the last OFDM block of the experimental data of FIG. 5.

The channel estimates shown in FIG. 10 represent the transfer function magnitudes for three of the 12 receiver elements during the last OFDM block. The value of the channel tracking constant λ used was 0.99. The figure indicates that the channel has a high degree of frequency selectivity. Although the channel estimates differ across the receiver array, some similar selectivity patterns can be observed. Time variations of the channel estimates are slow enough to enable successful tracking but adaptive channel estimation is still important to the overall system performance.

The experimental results set described above show that when Doppler distortion is caused by motion, a simple model can be used to track the phase of all subchannels. The method for Doppler compensation of an OFDM signal according to the invention utilizes low-complexity post-FFT phase tracking and adaptive MMSE combining of signals received across a receiver array.

While the invention has been shown and described with reference to specific embodiments, it should be understood by those skilled in the art that various changes in form and detail may be made therein without departing from the spirit and scope of the invention.

What is claimed is:

1. A method for Doppler compensation of an orthogonal frequency division multiplexed (OFDM) signal, the method comprising:
    determining a predicted phase for each subchannel in a plurality of subchannels for a current OFDM block in response to a phase estimate and a Doppler rate for a previous OFDM block;
    determining an angular offset for each of the subchannels over the duration of the previous OFDM block;
    generating an estimate of the Doppler rate for the current OFDM block;
    determining a final phase estimate for each of the subchannels in response to the estimate of the Doppler rate for the current OFDM block;
    generating a data symbol estimate for each of the subchannels in response to a respective one of the final phase estimates; and
    deciding a data symbol value for each of the subchannels based on a respective one of the data symbol estimates.

2. The method of claim 1 wherein determining the angular offset for each of the subchannels comprises:
    determining a preliminary estimate of a data symbol for the subchannel from a current signal vector and the predicted phase for the subchannel; and
    generating a tentative data symbol decision in response to the preliminary estimate of the data symbol for the subchannel.

3. The method of claim 2 wherein the preliminary estimate of the data symbol for the subchannel is determined from the current signal vector, the predicted phase for the subchannel and an estimate of a channel vector for the previous OFDM block.

4. The method of claim 1 wherein generating the estimate of the Doppler rate for the current OFDM block comprises generating a mean Doppler rate for at least two subchannels.

5. The method of claim 4 wherein the mean Doppler rate is determined for at least one pilot channel.

6. The method of claim 4 wherein the mean Doppler rate is first determined for at least one pilot channel and subsequently determined for a plurality of subchannels.

7. The method of claim 2 wherein the current signal vector is determined from a spatially-distributed sampling of the OFDM signal.

8. The method of claim 1 wherein the OFDM signal is an acoustic signal.

9. The method of claim 1 wherein the OFDM signal is a phase-shift keying modulated signal.

10. A receiver for detection of an orthogonal frequency division multiplexed (OFDM) signal, comprising:
- an array of spatially-distributed receiver elements;
- a plurality of Fast Fourier Transform (FFT) demodulators each in communication with a respective one of the spatially-distributed receiver elements;
- an adaptive phase tracker in communication with the FFT demodulators and configured to track the phases of a plurality of subchannels of the OFDM signal for non-uniform Doppler compensation of the subchannels based on a phase estimate for each of the subchannels, each phase estimate being determined from a predicted phase for each subchannel for a current OFDM block in response to a phase estimate and a Doppler rate for a previous OFDM block, an angular offset for each of the subchannels over the duration of the previous OFDM block and an estimate of the Doppler rate for the current OFDM block; and
- a minimum mean square error (MMSE) combiner in communication with the adaptive phase tracker to perform adaptive channel estimation.

11. The receiver of claim 10 wherein the OFDM signal is an acoustic signal.

12. The receiver of claim 11 wherein the receiver elements are acoustic receiver elements.

* * * * *